(12) United States Patent
Miyagawa

(10) Patent No.: US 6,856,426 B1  
(45) Date of Patent: Feb. 15, 2005

(54) SOLID STATE SCANNING TYPE OPTICAL RECORDING DEVICE

(75) Inventor: Yuta Miyagawa, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/441,657

(22) Filed: Nov. 16, 1999

(30) Foreign Application Priority Data

Nov. 17, 1998 (JP) .......................................... 10-326386

(51) Int. Cl.$^7$ .......................... G06K 15/00; B41B 19/00
(52) U.S. Cl. .................... 358/1.7; 358/1.4; 358/3.01; 358/3.02; 358/521; 347/118; 347/132; 347/134; 347/136; 347/144; 399/51
(58) Field of Search ................. 358/1.1–1.9, 1.11–1.18, 358/3, 2.1, 3.01–3.02, 3.1, 521, 534, 296, 300, 513; 353/54, 81, 83, 84, 89, 113–117, 119–121; 347/118, 130, 131, 132, 134–136, 144, 225, 233, 238–244, 251–256; 345/589, 596, 612–614, 183, 44, 46, 47–51, 87, 89, 91, 99; 399/51, 128, 146, 151, 152, 153, 177, 181, 191, 198, 220

(56) References Cited

U.S. PATENT DOCUMENTS

| | | | | |
|---|---|---|---|---|
| 3,938,144 A | * | 2/1976 | Pederson et al. | .......... 370/305 |
| 5,539,525 A | * | 7/1996 | Tanuma et al. | ............ 358/3.02 |
| 5,614,936 A | | 3/1997 | Takahashi | .................... 347/240 |
| 5,872,587 A | * | 2/1999 | Fujita et al. | ................. 347/132 |
| 6,081,321 A | * | 6/2000 | Miyagawa | .................... 355/71 |
| 6,094,187 A | * | 7/2000 | Jones et al. | ................. 345/690 |
| 6,278,474 B1 | * | 8/2001 | Wada et al. | ................. 347/241 |

FOREIGN PATENT DOCUMENTS

| | | |
|---|---|---|
| JP | 06019009 | 1/1994 |
| JP | 08276620 | 10/1996 |
| JP | 09300699 | 11/1997 |
| JP | 10181083 | 7/1998 |

* cited by examiner

Primary Examiner—King Y. Poon
(74) Attorney, Agent, or Firm—McDermott Will & Emery LLP (57) ABSTRACT

An 8-bit (256 gradient) image is represented using a driver IC of 6-bit (64 gradient) construction to drive a plurality of arrayed optical shutter elements. The image data are divided into 64 gradient sections, synchronized by shift clock signals, and transmitted in four cycles to the shift register. The optical shutter element is not turned OFF at the 64th pulse, but is continuously driven without transmitting to the comparator the standard clock signal of the 64th pulse, which controls the ON time of the optical shutter element.

In this way, an image of a higher number of gradient levels can be represented using a driver IC of a low number of bits, thereby providing a solid state scanning type optical recording device which suppresses noise generation by reducing the load on the driver IC when driving at multi-level gradient.

13 Claims, 10 Drawing Sheets

SOLID STATE SCANNING TYPE OPTICAL RECORDING DEVICE

CROSS-REFERENCE TO RELATED APPLICATIONS

The present application claims priority to Japanese Patent Application No. 10-326386 filed Nov. 17, 1998, the content of which is hereby incorporated by reference.

DESCRIPTION OF THE INVENTION

1. Field of the Invention

The present invention relates to a solid state scanning type optical recording device for recording an image (latent image) on the surface of a photosensitive member by ON/OFF switching of light based on image data using a plurality of modules of electro-optic elements having an electro-optic effect (e.g., an optical shutter device formed of PLZT).

2. Description of the Related Art

In general, there have been various proposals for solid state scanning type optical recording devices which control the ON/OFF switching of light for individual pixels using electro-optic elements, e.g., an optical shutter element formed of PLZT, to form an image (latent image) on an electrophotographic photosensitive member, film or a printing paper having a silver sale-sensitive member. Heretofore, the driver integrated circuit (IC) for driving the optical shutter element has mainly controlled 64 gradients of 6-bits.

There has been demand in recent years for 8 to 12 bit gradient control for digital color images. It is believed that to increase the 8 to 12 bit driver ICs henceforth will become mainstream and the number of gradients will increase.

New design and production of 8 to 12 bit driver ICs to match the increase in the number of gradients present disadvantages in terms of development time and cost.

SUMMARY OF THE INVENTION

An object of the present invention is to eliminate the previously mentioned disadvantages.

Another object of the present invention is to provide an electro-optic element drive device which minimizes noise generation.

Another object of the present invention is to provide a solid state scanning type optical recording device having few operation errors.

These and other objects are attained by an optical shutter drive device comprising:
 an optical shutter module arraying a plurality of optical shutters having an electro-optic effect; and
 a driver for modulating the ON time of each optical shutter element based on the image data;
 wherein the driver can modulate each optical shutter element at a gradient corresponding to a predetermined number of bits, so as to drive the optical shutter element at a gradient exceeding a maximum gradient at a predetermined number of bits without turning OFF the optical shutter element when driving one line.

These objects are further attained by a solid state scanning type optical recording device comprising:
 optical shutter elements having an electro-optic effect; and
 a driver for dividing one line into a plurality of sections in the subscan direction and modulating the ON time of the optical shutter elements based on the image data of each section by a predetermined number of bits fewer than the number of bits of the image data, and driving the optical shutter element at a gradient exceeding a maximum gradient corresponding to the predetermined number of bits;
 wherein the driver includes a shift register for forwarding image data synchronously with a shift clock;
 a latch register for latching image data of one section within the shift register in response to a strobe signal;
 a counter for counting standard clock signals; and
 a comparator for turning ON each optical shutter element, comparing the value latched in the latch register with the count value of the counter, and turning OFF each optical shutter element when both values match.

These objects are further attained by an electro-optic element drive device comprising:
 electro-optic elements having an electro-optic effect; and
 a driver for modulating the ON time of the electro-optic elements based on the image data by a predetermined number of bits, and driving the electro-optic element at a gradient exceeding a maximum gradient corresponding to the predetermined number of bits.

The invention itself, together with further objects and attendant advantages will be best understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the solid state scanning type optical recording device of the present invention are described hereinafter with reference to the accompanying drawings.

Figure 1:
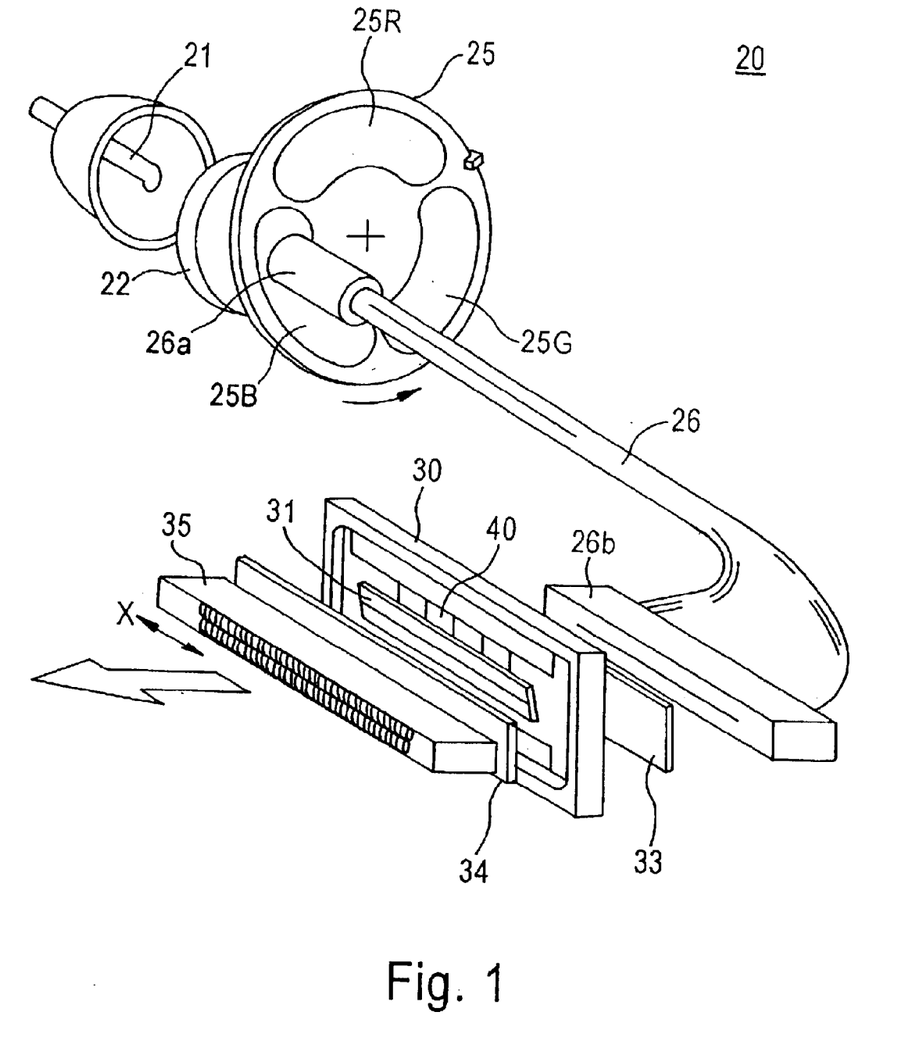
FIG. 1 is a brief perspective view of an optical recording device of the present invention.

Optical Recording Device (refer to FIG. 1)

FIG. 1 shows a full color optical recording device 20 application of the present invention. The optical recording device 20 records a full color image on printing paper or the like, and briefly comprises halogen lamp 21, heat sink filter 22, RGB filter 25, optical fiber array 26, optical shutter module 30, and an image forming lens array 35. A full color recording is accomplished by overlaying the color-separated R, G, B images of the three primary colors to reproduce the color image, and this method itself is well known.

The RGB filter 25 is driven in rotation synchronously with the recording by the optical shutter module 30 described later, so as to change the color of the light passing therethrough for each one line. The optical fiber array 26 comprises a plurality of optical fibers, of which one end 26a is bundled and confronts the RGB filter 25. The other end 26b is aligned in the main scan direction represented by the X arrow in the drawing so as to emit light in a linear array.

The optical shutter module 30 provided with an array 31 of chips comprising a plurality of optical shutter elements formed of PLZT on a glass substrate, or slit-like apertures on a ceramic substrate, and is further provided with a driver IC 40 for each such chip. Each optical shutter element is driven by a pulse width modulation method directed only for the pixels recorded by the driver IC 40. Polarization plates 33 and 34 are disposed anteriorly and posteriorly to the optical shutter module 30.

PLZT is a well known ceramic having light transmitting characteristics and an electro-optic effect with a large Kerr constant; the light linearly polarized by the polarization plate 33 is subjected to rotation of the polarization plane by switching ON/OFF the electric field generated by a voltage applied to the optical shutter element, so as to switch ON/OFF the light emitted from the polarization panel 34. The light emitted from the polarization plate 34 forms an image on the printing paper through the image forming lens array 35 so as to form a latent image.

In the optical recording device 20, an ND filter and a color correction filter may be disposed anterior to or posterior to the heat sink filter 22, and a slit plate maybe interposed between the optical fiber array 26 and the polarization plate 33.

Figure 2:
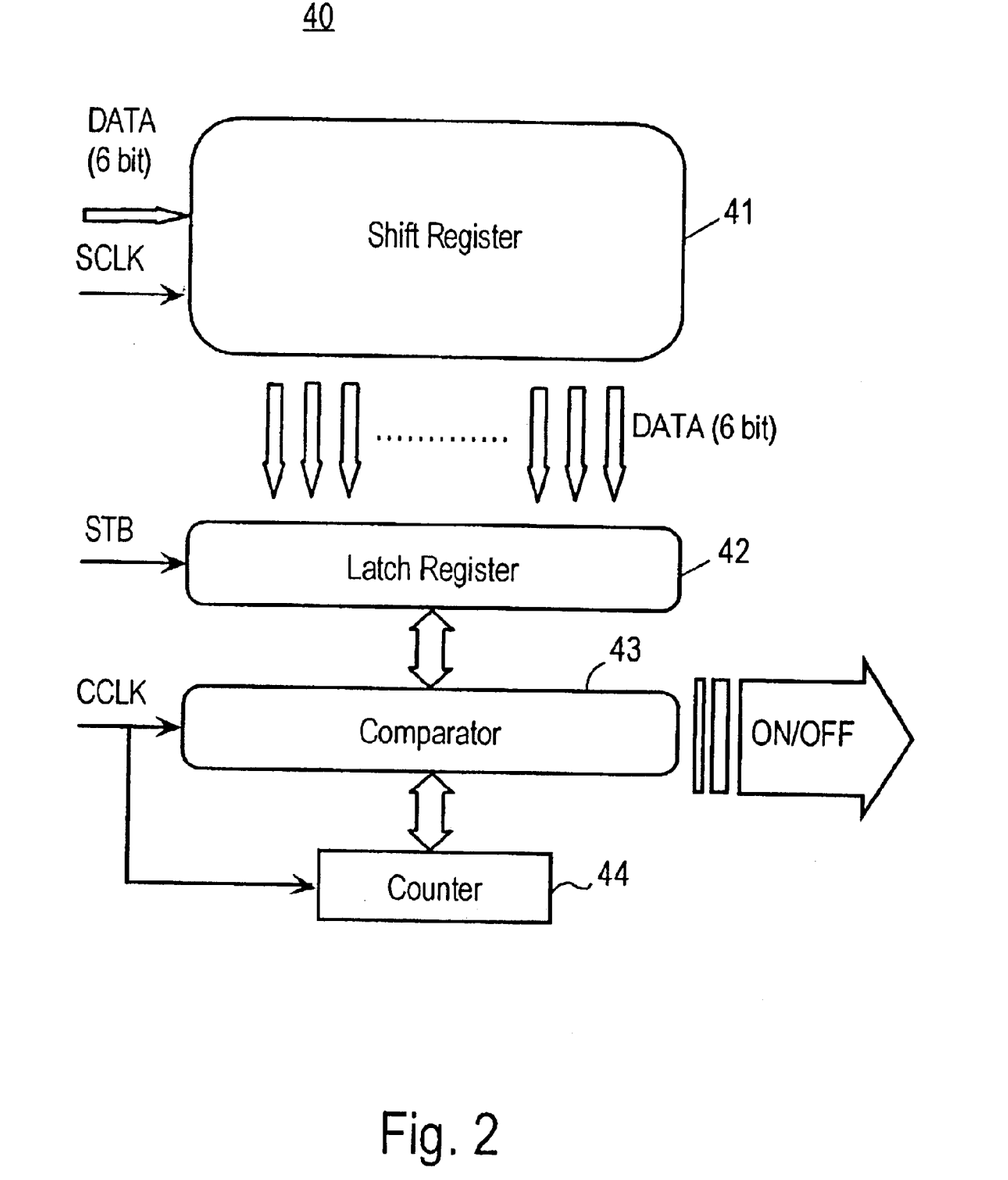
FIG. 2 is a block diagram of the driver IC of the optical recording device.

Driver IC (Refer to FIG. 2)

FIG. 2 shows the construction of the driver IC used in the present invention. The diver IC 40 uses a plurality of n individual ICs connected by a ladder chain. Each IC 40 is constructed to drive 64 dots, and is provided with a 6-bit shift register 41, a 6-bit latch register 42, a 6-bit comparator 43, and a 6-bit counter 44 as the main components.

The image data DATA are synchronized by the shift clock signal SCLK and transmitted to the shift register 41, and latched in the latch register 42 in response to a strobe signal STB. The gradient is set for each pixel in this way. The standard clock signals CCLK are counted by the counter 44, and the comparator 43 compares the latched value with the count value of the counter 44, and the moment the two values match, the control output to the optical shutter element is terminated. The counter 44 is reset by a reset signal CL. The ON/OFF switching of each optical shutter element is controlled based on the output of the comparator 43.

Figure 3:
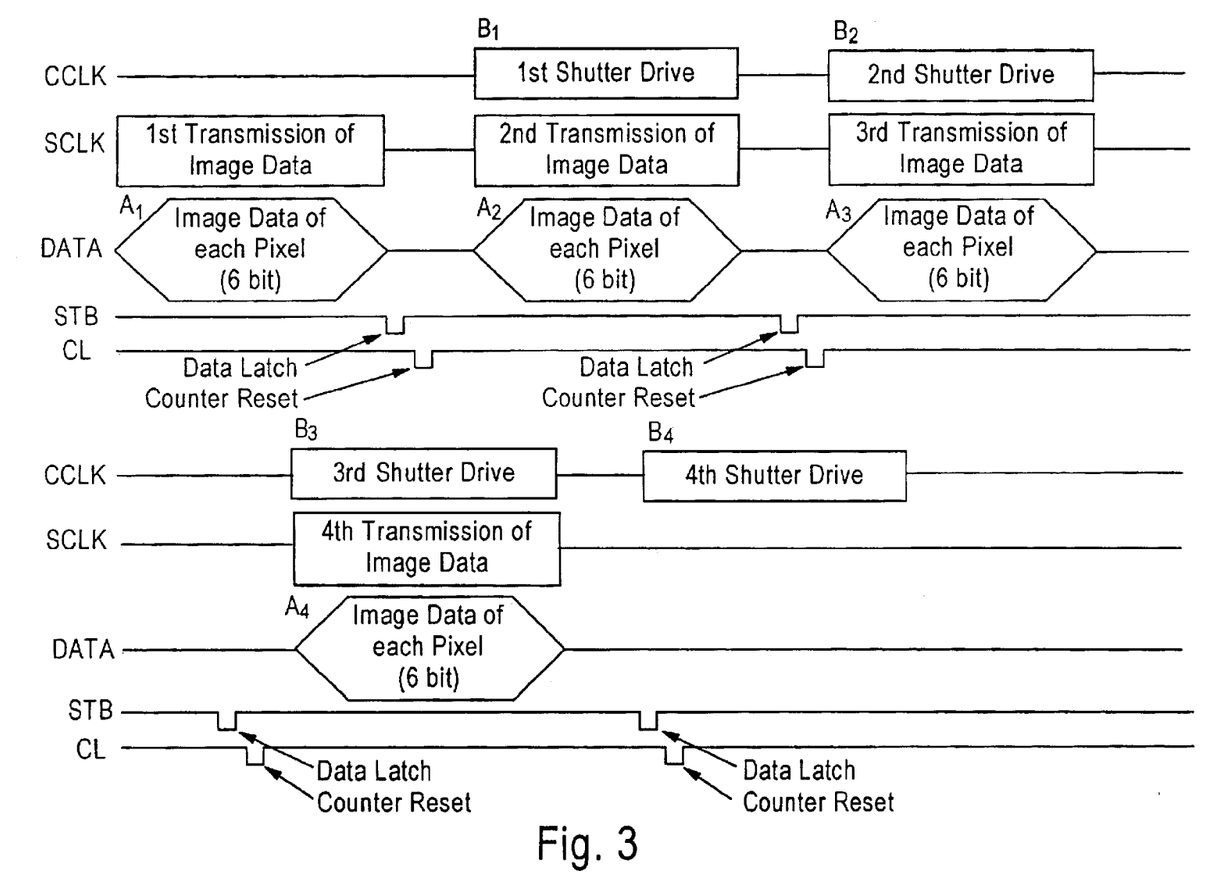
FIG. 3 is a timing chart of the driver IC of a first embodiment of the present invention.
Figure 4:
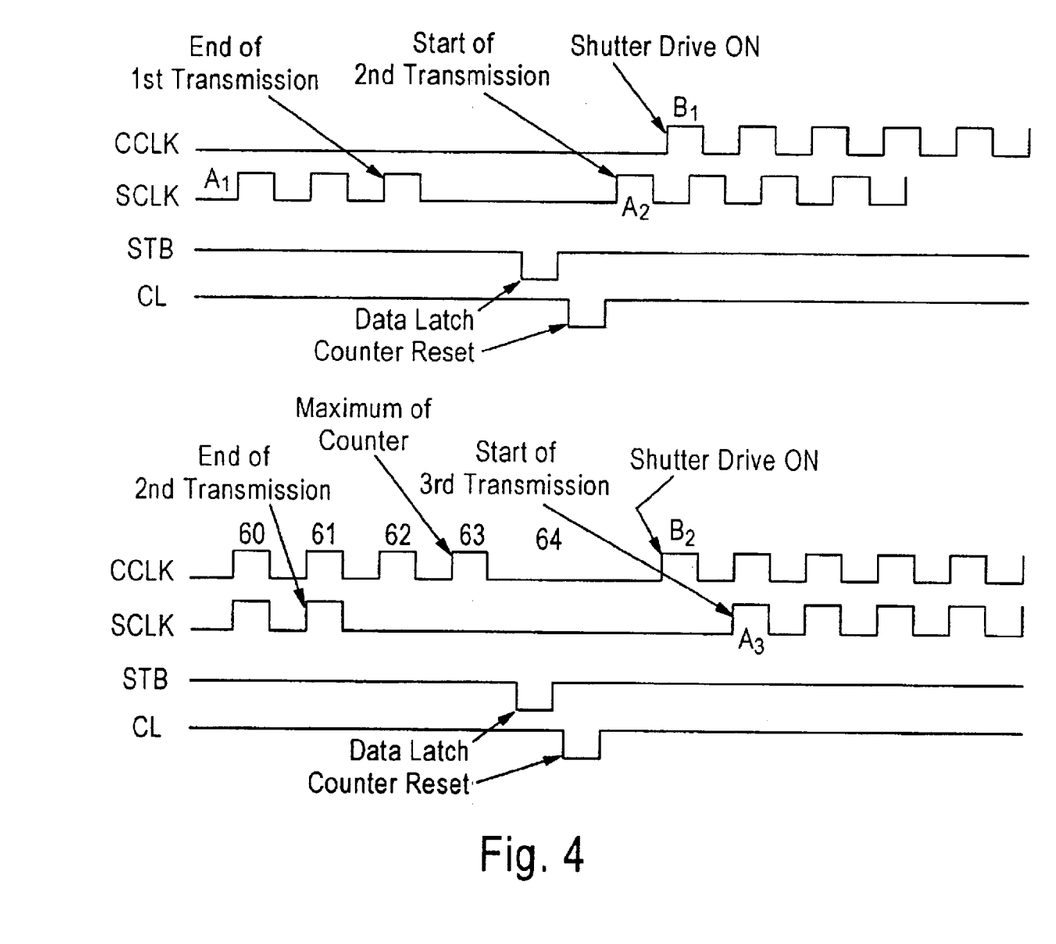
FIG. 4 is a timing chart of the various types of signals in a first embodiment of the present invention.

First Embodiment (Refer to FIGS. 3, 4)

The first embodiment uses the driver IC 40 for driving 64 gradients at 6-bits shown in FIG. 2, so as to output images having a higher number of bits, e.g., 8-bit images (256 gradients).

The image data comprise a maximum of 256 gradient levels, which are divided into four 64-gradient sections, synchronized with the shift clock signal SCLK, and transmitted to the shift register 41 at time regions A1, A2, A3, A4, as shown in FIG. 3. When transmission of image data of a single cycle is completed, the strobe signal STB is set, and the counter 44 is reset. Thereafter, the shutter drive of one cycle is executed in the time region B1. The shutter drive is executed successively at time regions B2, B3, B4 as the data transmission ends for each 64-gradient section.

The drive voltage normally applied to each optical shutter element is turned OFF once each time the standard clock signal CCLK has 64 pulse transmissions in the 6-bit specification driver IC. The drive voltage is 40–70 V, and when managing 8-bit 256 gradient image data directly by a conventional 6-bit specification driver IC, the drive voltage is turned OFF with a timing of a maximum four times, and the load increases on the driver IC 40.

In the first embodiment, the transmission of the standard clock signal CCLK is stopped at pulse 63, and the image data are latched and the counter 44 is reset without transmitting pulse 64. According to this control, the optical shutter element can be driven without unnecessarily turning OFF the drive voltage during the drive time of one line of gradients in excess of 64 gradients. In this way, the load is reduced on the driver IC 40, and noise generation is suppressed.

In the first embodiment, the timing is shifted for generating the strobe signal STB and the counter reset signal CL. Although both signals may be generated with the same timing, shifting the timing of the signal generation reduces the load on the driver IC 40.

Although the first embodiment is described by way of example representing an 8—bit (256 gradient) image via a 6 bit specification driver IC, the image may be similarly represented in gradient levels in excess of 8-bit. For example, in the case of a 10-bit (1024 gradient) image, the image data of 64 gradients may be divided 16 times and transmitted to the shift register 41. On the other hand, it is also possible to represent even higher gradient levels via an 8-bit driver IC. General Purpose Mode of First Embodiment (refer to FIG. 5)

Figure 5:
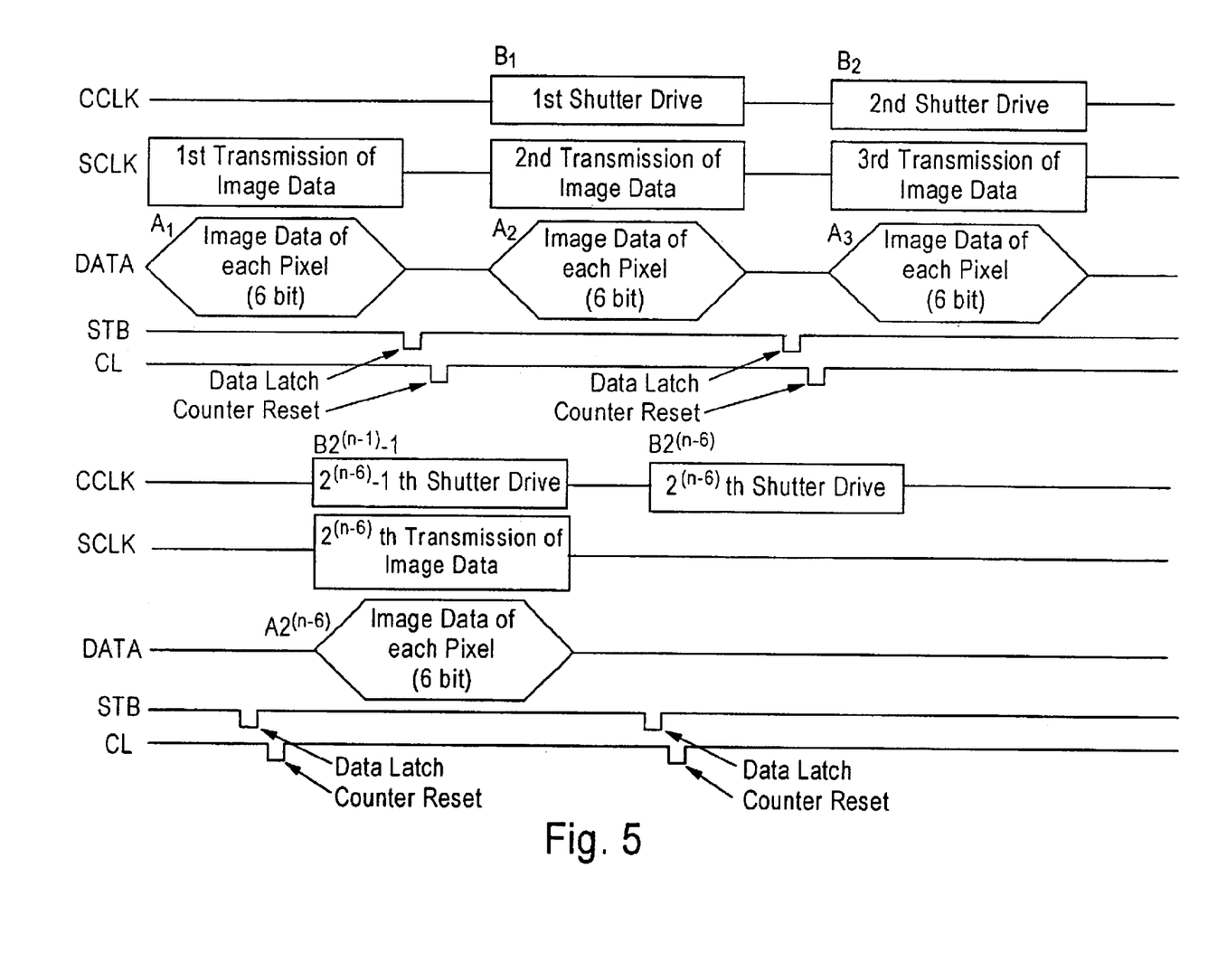
FIG. 5 is a timing chart of the various types of signals in the general-purpose mode of the first embodiment of the present invention.

FIG. 5 shows the general purpose mode of the first embodiment. An image of n bits (n>=7) is represented by the 6-bit specification driver IC. Of course the driver IC may have other than a 6-bit specification.

That is, the image data divided into 64 gradients for each pixel are transmitted to the shift register 41 at time regions A1, A2, A3, . . . A2(n–6). On the other hand, the shutter drive is executed at the time regions B1, B2, . . . B2(n–6)–1, B2(n–6).

Figure 6:
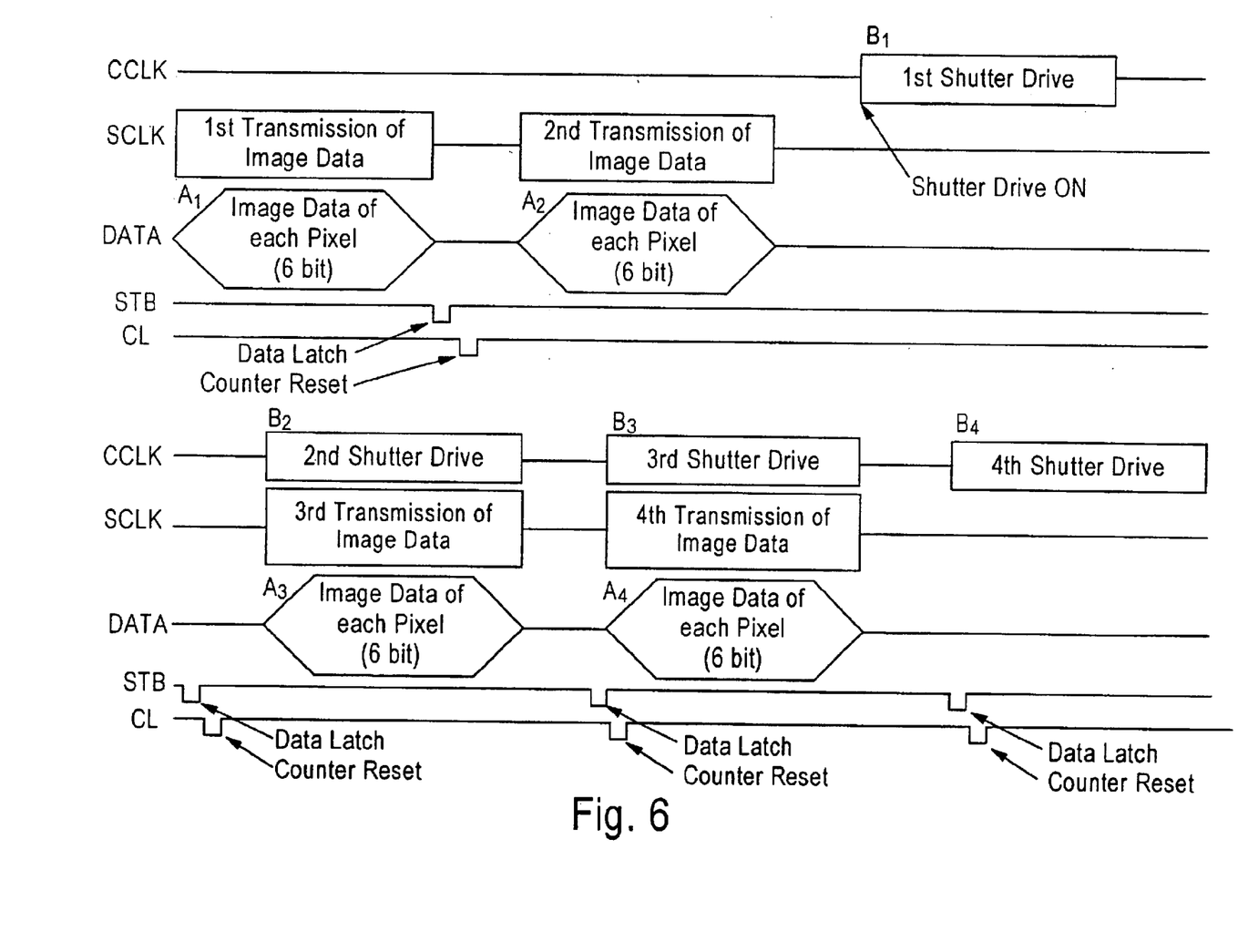
FIG. 6 is a timing chart of the driver IC of a second embodiment of the present invention.
Figure 7:
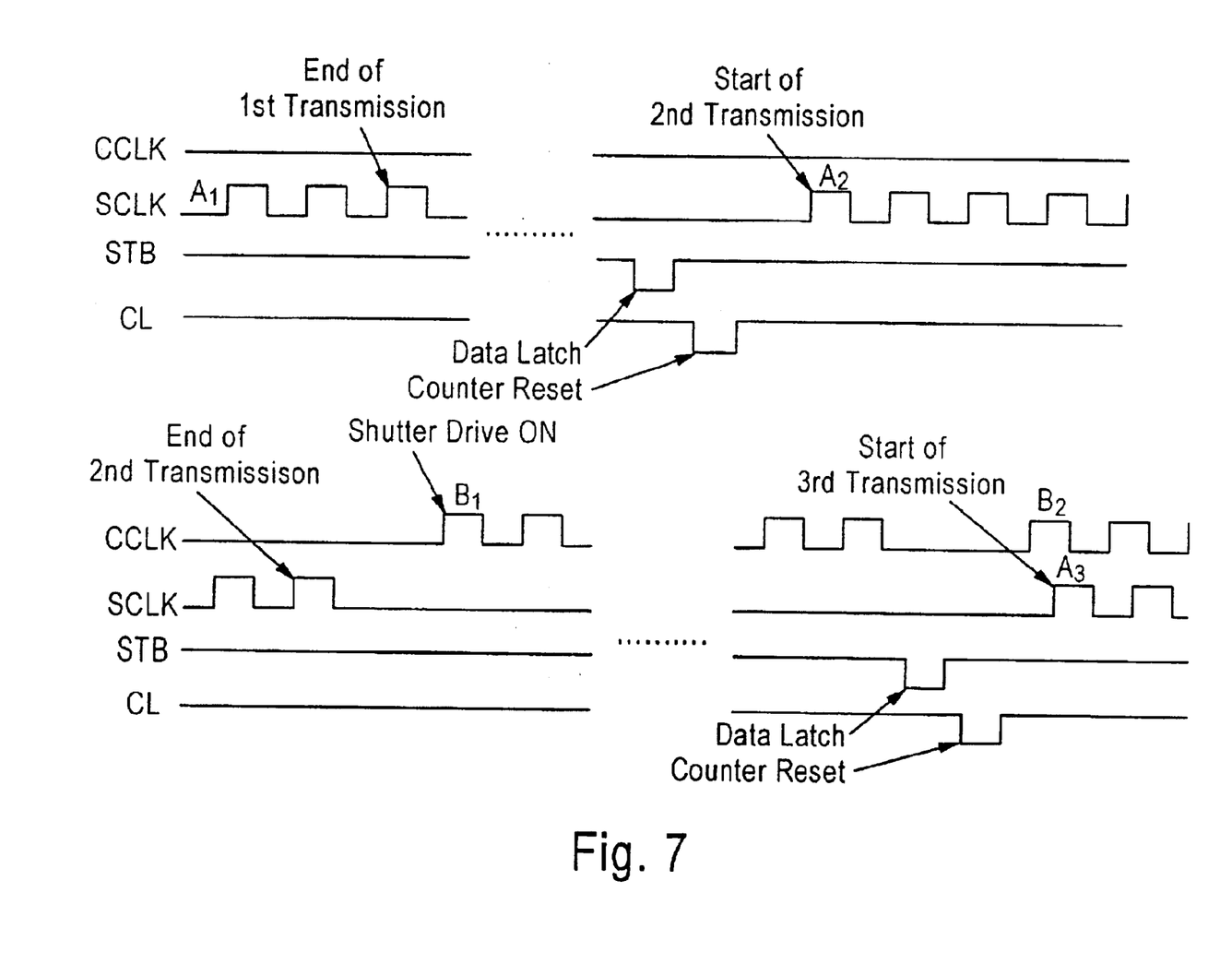
FIG. 7 is a timing chart of the various types of signals in the second embodiment of the present invention.

Second Embodiment (Refer to FIGS. 6, 7)

The second embodiment represents an image of higher multi-level gradients by a driver IC of fixed bit specification. Basically, the driver IC 40 of FIG. 2 is used, and turning the voltage OFF during the drive is avoided without transmitting the 64th standard clock signal CCLK to the shift register 41 similar to the first embodiment. A point of departure relative to the first embodiment is that the first cycle image data are transmitted at time region A1, and after the data are latched in the latch register 42, the second cycle image data are successively transmitted at time region A2, as shown in FIGS. 6 and 7. Thereafter, the first cycle optical shutter element is driven at the time region B1. At this time, image data are not transmitted. Directly after the first cycle optical shutter element drive ends, the data transmitted in the second cycle are latched, and subsequently the second cycle optical shutter element is driven. At this time, in the time region A3, the third cycle image data are transmitted.

Voltage application to each optical shutter element starts (recording is ON) simultaneously with the start of the first cycle drive. At this time, when image data are transmitted, there is concern of erroneous operation by the shift register 41 due to 1 the influence of noise generated when recording is ON. However, in the second embodiment, the concern of erroneous operation by the shift register 41 is eliminated by avoiding image data transmission when recording is ON.

Figure 8:
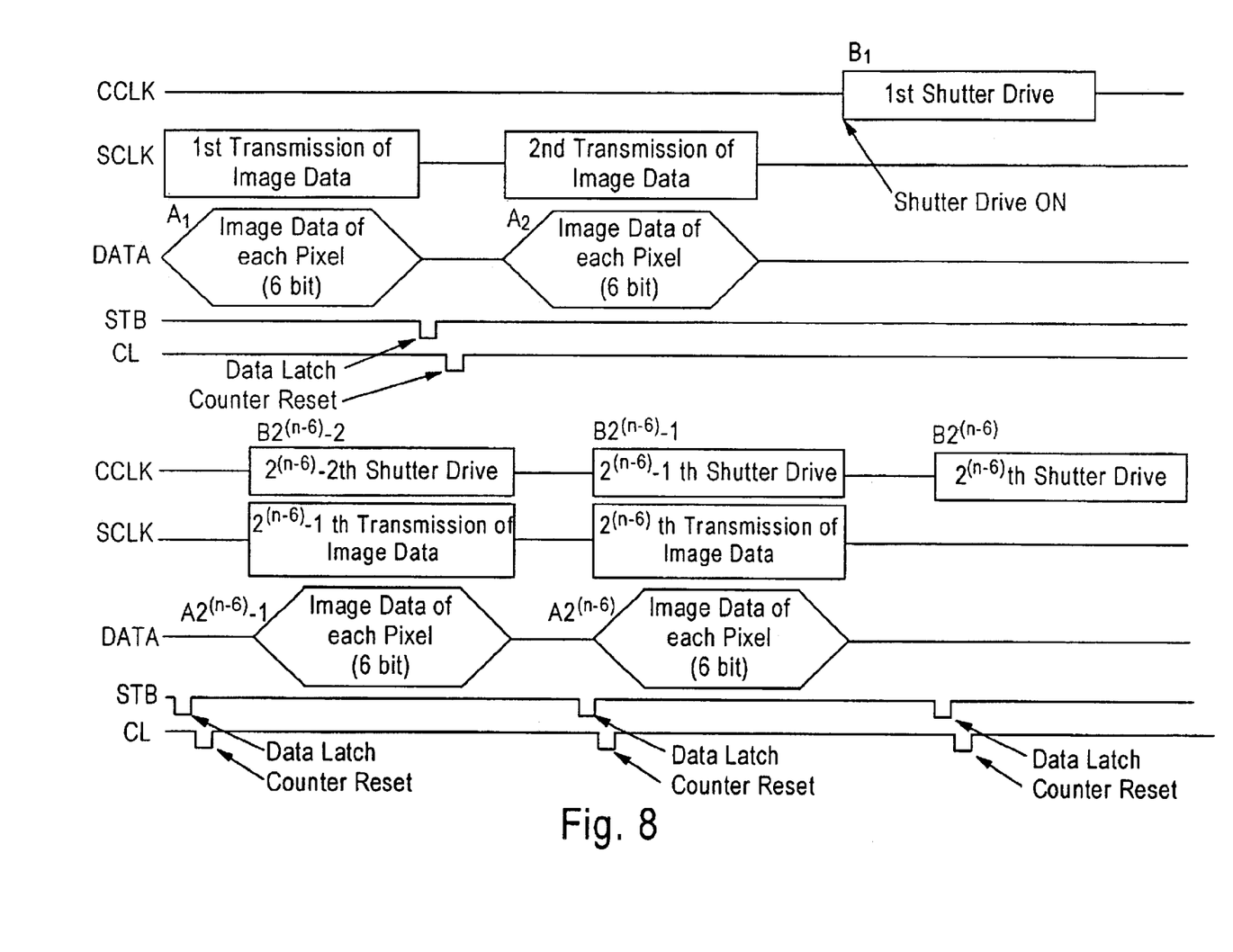
FIG. 8 is a timing chart of the various types of signals in the general-purpose mode of the second embodiment of the present invention.

General Purpose Mode of Second Embodiment (Refer to FIG. 8)

FIG. 8 shows the general purpose mode of the second embodiment wherein an image of n bits (n>=7) is represented by a 6-bit specification driver IC. In the general purpose mode, the driver IC naturally may have other than a 6-bit specification.

When the optical shutter elements are driven in the first cycle at time region. B1, image data are not transmitted. Accordingly, the time region A2 (n-6) wherein the final gradient image data are transmitted overlaps the time region B2(n-6) wherein the 2(n-6)-1 cycle shutter drive is executed, such that in the recording of one line, the 2(n-6) cycle shutter drive is executed independently at the final time region B2(n-6).

Figure 9:
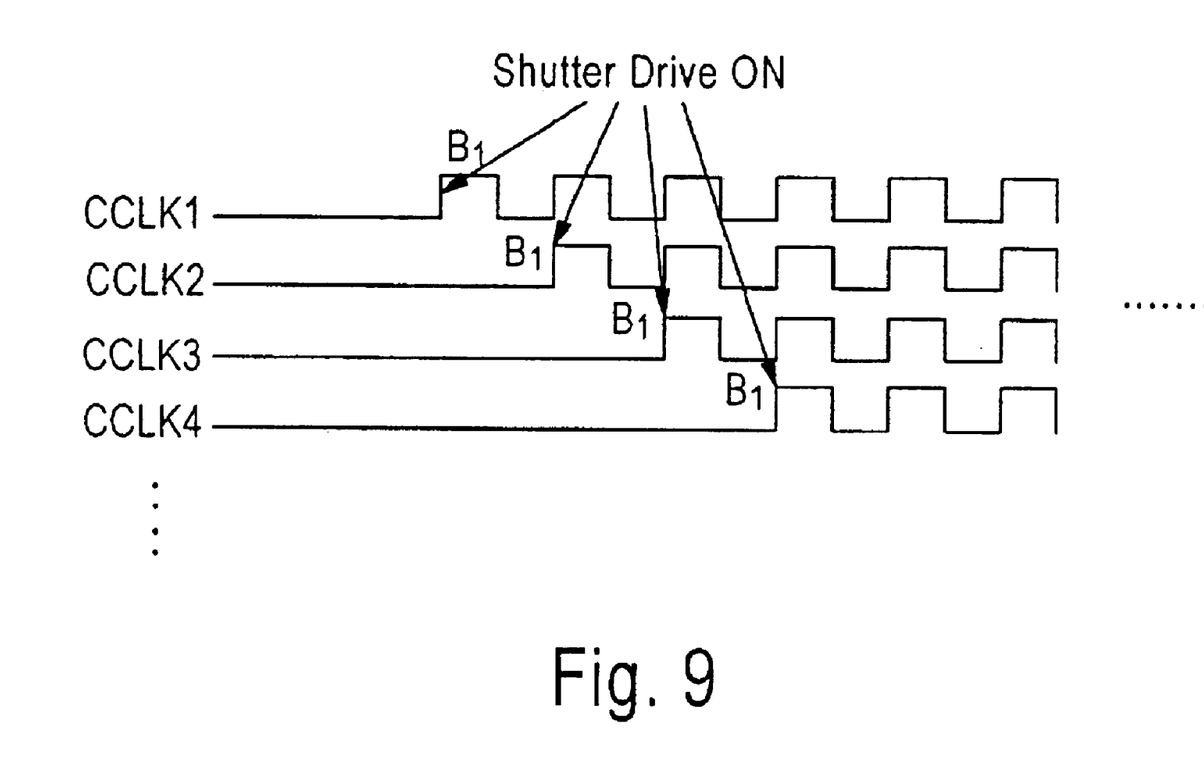
FIG. 9 is a timing chart of the various types of signals in a third embodiment of the present invention.

Third Embodiment (Refer to FIG. 9)

The third embodiment disperses the ON timing (recording is ON) of each optical shutter element in addition to providing the controls described in the first and second embodiments. Specifically, as shown in FIG. 9, the standard clock signals CCLK1, CCLK2 and the like corresponding to each optical shutter element are dispersed by providing delays in the timing for transmission to the comparator 43 and the counter 44. In this way, noise generation is reduced when switching the optical shutter element from the OFF state to the ON state by the small shifts in the timing of the voltage application to the optical shutter elements. The dispersion mode is not limited to that shown in FIG. 9, e.g., the signals CCLK1, CCLK2 and the like may be dispersed in random sequence, or dispersed in fixed blocks.

Figure 10:
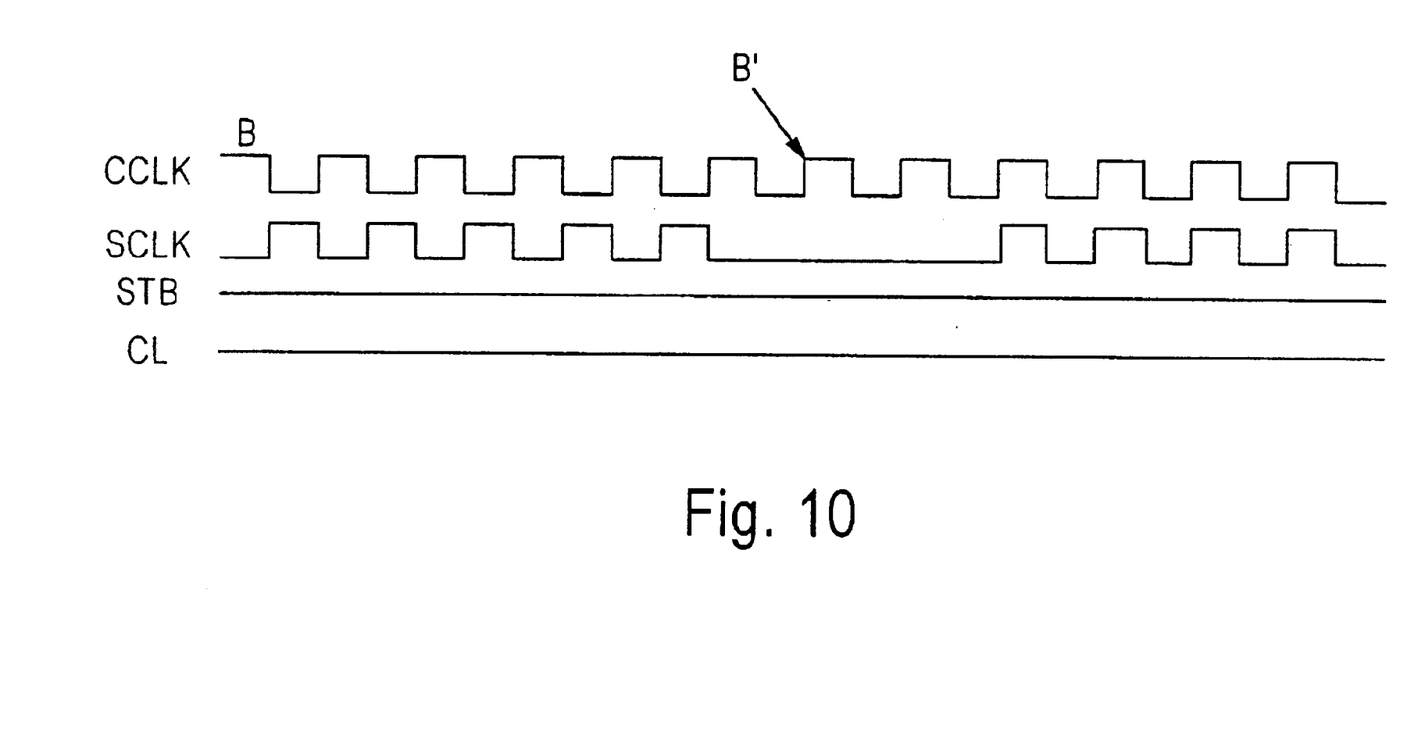
FIG. 10 is a timing chart of the various types of signals in a fourth embodiment of the present invention.

Fourth Embodiment (Refer to FIG. 10)

The fourth embodiment avoids turning OFF a plurality of optical shutter elements with identical timing so as to transmit image data to the shift register 41 in addition to providing the controls of the first, second, and third embodiments. Specifically, as shown in FIG. 10, if a plurality of optical shutter elements are turned OFF with timing B' in the timing region B wherein the standard clock signal CCLK is transmitted, the shift clock signal SCLK is not transmitted to the shift register 41 before or after so as to not transmit image data. In this way, noise generation is reduced when switching a plurality of optical shutter element from the ON state to the OFF state.

The timing B' can be known from the group of image data transmitted to the shift register 41 before the optical shutter element is actually driven.

The solid state scanning type optical recording device of the present invention is not limited to the previously described embodiments, and may be variously modified insofar as such modifications do not depart from the scope of the invention. In particular, a liquid crystal shutter, deformable device (DMD) and the like may be used instead of the PLZT as an optical shutter element.

In the embodiments described above, a driver IC modulates the ON time of each optical shutter element at a gradient corresponding to a fixed number of bits, and the optical shutter elements are driven at a gradient exceeding the maximum gradient of the fixed number of bits without turning OFF the optical shutter element during the drive period of one line.

That is, when representing an image of a greater level of gradients using a driver which represents an image of 65 gradients at a fixed 6-bits, e.g., when representing an 8-bit image of 256 gradients, in a conventional device the optical shutter are simultaneously turned OFF at every 64th gradient, and a voltage of 40~70 V is applied to each optical shutter element. For this reason, the load on the control means increases and causes a noise generation problem. In the embodiments of the present invention, however, the optical shutter elements are not turned OFF at the maximum gradient of the fixed number of bits, but rather the optical shutter elements are driven at a gradient in excess of the maximum gradient level of the fixed number of bits.

Accordingly, the optical shutter elements modulated at multi-level gradient are not turned OFF simultaneously at each maximum gradient level of the fixed number of bits of the driver, thereby reducing the load on the control means, suppressing noise generation, and eliminating erroneous operation of the driver.

The most desirable method for avoiding turning OFF the optical shutter element at each maximum gradient at the fixed number of bits will not transmit the comparator a drive clock signal corresponding to the maximum count value of the fixed number of bits.

If the driver is constructed so as to shift the image data latch timing and the counter reset timing, the load on the driver can be reduced.

If the driver is constructed so as to avoid a timing for turning ON the optical shutter element to transmit image data to the shift register, the influence of noise can be eliminated when switching the optical shutter element from the OFF state to the ON state when transmitting the image data. If the driver is constructed so as to turn ON each optical shutter element with a dispersed timing, noise generation can be reduced when switching the optical shutter element from the OFF state to the ON state. Furthermore, if the driver is constructed so as to avoid turning OFF a plurality of optical shutter elements with identical timing to transmit image data to the shift register, noise generation can be reduced when switching the optical shutter elements from the ON state to the OFF state.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A solid state scanning type optical recording device comprising:

optical shutter elements having an electro-optic effect; and a driver for dividing one line into a plurality of sections in the subscan direction and modulating the ON time of said optical shutter elements based on the image data of each section by a predetermined number of bits fewer than the number of bits of the image data, and driving said optical shutter elements at a gradient exceeding a maximum gradient corresponding to the predetermined number of bits;

wherein the driver includes a shift register for forwarding image data synchronously with a shift clock;

a latch register for latching image data of one section within said shift register in response to a strobe signal;

a counter for counting standard clock signals; and a comparator for turning ON each optical shutter element, comparing the value latched in the latch register with the count value of the counter, and turning OFF each optical shutter element when both values match.

2. A solid state scanning type optical recording device according to claim 1, wherein said driver is constructed not to transmit said comparator the standard clock signal corresponding to the maximum count value of the fixed number of bits.

3. A solid state scanning type optical recording device according to claim 1, wherein the timing is shifter for generating the strobe signal and resetting said counter.

4. A solid state scanning type optical recording device according to claim 1, wherein said driver turns ON each optical shutter element with a dispersed timing.

5. A solid state scanning type optical recording device according to claim 1, wherein said driver is constructed so as to avoid turning OFF a plurality of optical shutter elements with identical timing to transmit image data to said shift register.

6. A solid state scanning type optical recording device according to claim 1, wherein said driver is constructed so as to avoid a timing for turning ON said optical shutter elements with identical timing to transmit image data to said shift register.

7. A solid state scanning type optical recording device according to claim 6, wherein said driver transmits image data corresponding to first and second section to said shift register, thereafter drives said optical shutter elements based on the image data corresponding to the first section, and thereafter transmits image data corresponding to a third section to said shift register.

8. An electro-optic element drive device comprising:

electro-optical elements having an electro-optic effect; and a driver for modulating the ON time of the electro-optic elements based on the image data by a predetermined number of bits, and driving each of said electro-optic elements at a gradient exceeding a maximum gradient corresponding to the predetermined number of bits without turning OFF the electro-optic elements when driving one line.

9. An electro-optic element drive device according to claim 8, wherein the predetermined number of bits is fewer than the number of bits of the image data.

10. An electro-optic element drive device according to claim 8, wherein said electro-optic elements are an optical shutter.

11. An electro-optic element drive device according to claim 8, wherein said driver turns ON said each of said electro-optic elements with a dispersed timing.

12. An electro-optic element drive device according to claim 8, further comprising a counter for counting standard clock signals, wherein said driver turns ON said each of said electro-optic elements when a count value of the counter reaches to a number corresponding to the image data.

13. An optic element drive device according to claim 12, wherein said counter resets the count value without counting the standard clock signals corresponding to the maximum gradient.

* * * * *